United States Patent
Lee et al.

(10) Patent No.: US 9,128,561 B2
(45) Date of Patent: Sep. 8, 2015

(54) METHOD OF DRIVING A DISPLAY PANEL, DISPLAY PANEL DRIVING APPARATUS FOR PERFORMING THE METHOD AND DISPLAY APPARATUS HAVING THE DISPLAY PANEL DRIVING APPARATUS

(71) Applicant: Samsung Display Co., LTD., Yongin, Gyeonggi-Do (KR)

(72) Inventors: Il-Ho Lee, Hwaseong-si (KR); Seong-Mo Hwang, Seongnam-si (KR); In-Cheol Kim, Asan-si (KR); Ji-Hong Park, Suwon-si (KR); Moon-Sung Choi, Incheon (KR); Seung-Ho Nam, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 308 days.

(21) Appl. No.: 13/738,446

(22) Filed: Jan. 10, 2013

(65) Prior Publication Data
US 2014/0071066 A1    Mar. 13, 2014

(30) Foreign Application Priority Data
Sep. 10, 2012    (KR) .......................... 10-2012-0099862

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01); *G06F 3/0412* (2013.01)

(58) Field of Classification Search
CPC ...................................................... G06F 3/0412
USPC ........................................................... 345/173
See application file for complete search history.

(56) References Cited

U.S. PATENT DOCUMENTS

| | | | |
|---|---|---|---|
| 2011/0090174 A1 | 4/2011 | Lin | |
| 2012/0056835 A1* | 3/2012 | Choo et al. | 345/173 |
| 2013/0057512 A1* | 3/2013 | Lillie et al. | 345/174 |

FOREIGN PATENT DOCUMENTS

| | | |
|---|---|---|
| JP | 2010015505 A | 1/2010 |
| KR | 1020080061324 A | 7/2008 |
| KR | 1020080061325 A | 7/2008 |

* cited by examiner

*Primary Examiner* — Christopher E Leiby
(74) *Attorney, Agent, or Firm* — Cantor Colburn LLP

(57) ABSTRACT

A display panel driving apparatus a data driving part which applies a first data signal to a data line corresponding to a first area of the display panel during a first sub frame period of a frame period and applies a second data signal to a data line corresponding to a second area of the display panel during a second sub frame period of the frame period, and a touch driving part which applies a touch driving signal to a touch driving line of the display panel during a first blank period next to the first sub frame period and applies the touch driving signal to the touch driving line during a second blank period next to the second sub frame period and included in the frame period.

20 Claims, 15 Drawing Sheets

METHOD OF DRIVING A DISPLAY PANEL, DISPLAY PANEL DRIVING APPARATUS FOR PERFORMING THE METHOD AND DISPLAY APPARATUS HAVING THE DISPLAY PANEL DRIVING APPARATUS

This application claims to Korean Patent Application No. 10-2012-0099862, filed on Sep. 10, 2012 and all the benefits accruing therefrom under 35 U.S.C. §119, the content of which in its entirety is herein incorporated by reference.

BACKGROUND

1. Field

Exemplary embodiments of the invention relate to a display panel and a method of driving the display panel. More particularly, exemplary embodiments of the invention relate to a display panel that senses a touch thereon and a method of driving the display panel.

2. Description of the Related Art

Recently, a display apparatus including a display panel, such as a liquid crystal display panel, that senses a touch thereon has been developed to decrease the thickness of the display apparatus, which typically includes a touch panel and a display panel provided separately.

The display panel includes a touch driving line and a touch sense line configured to sense the touch thereon, the touch driving line and the touch sense line forms a capacitance, and a common electrode of the display panel may be used for the touch driving line.

A frame period typically includes an active period and a blank period, the display panel displays an image during the active period and the display panel senses the touch during the blank period. Thus, a common voltage is applied to the common electrode during the active period and a touch driving signal is applied to the common electrode during the blank period. In this case, a touch sense frequency of the display panel is typically substantially equal to a driving frequency of the display panel.

SUMMARY

Exemplary embodiments of the invention provide a method of driving a display panel with increased touch sense frequency.

Exemplary embodiments of the invention also provide a display panel driving apparatus performing the above-mentioned method of driving the display panel.

Exemplary embodiments of the invention also provide a display apparatus having the above-mentioned display panel driving apparatus.

According to an exemplary embodiment of the invention, there is provided a method of driving a display panel. The method includes: applying a first data signal to a data line corresponding to a first area of the display panel during a first sub frame period of a frame period; applying a touch driving signal to a touch driving line of the display panel during a first blank period of the frame period, where the first blank period is next to the first sub frame period; applying a second data signal to a data line corresponding to a second area of the display panel during a second sub frame period of the frame period, where the second sub frame period is next to the first blank period; and applying the touch driving signal to the touch driving line during a second blank period of the frame period, where the second blank period is next to the second sub frame period.

In one embodiment, the applying the touch driving signal to the touch driving line during the first blank period may include sequentially applying the touch driving signal to first to N-th touch driving lines, where N is a natural number, and the applying the touch driving signal to the touch driving line during the second blank period may include sequentially applying the touch driving signal to the first to N-th touch driving lines.

In one embodiment, the first area and the second area may be determined based on a number of gate lines disposed therein, a first gate signal may be applied to a gate line disposed in the first area during the first sub frame period, and a second gate signal may be applied to a gate line disposed in the second area during the second sub frame period.

In one embodiment, the touch driving signal may include a plurality of pulses.

In one embodiment, the method may further include applying a third data signal to a data line corresponding to a third area of the display panel during a third sub frame period of the frame period, where the third sub frame period is next to the second blank period, and applying the touch driving signal to the touch driving line during the third blank period of the frame period, where the third blank period is next to the third sub frame period.

In one embodiment, the frame period may include A sub frame periods and A blank periods respectively next to the A sub frame periods, where A is a natural number greater or equal to 2.

In one embodiment, the display panel may include A areas, a data signal may be applied to a data line corresponding to the A areas during the A sub frame periods, and the touch driving signal may be applied to the touch driving line during each of the A blank periods.

According to another exemplary embodiment of the invention, a display panel driving apparatus includes a data driving part which applies a first data signal to a data line corresponding to a first area of the display panel during a first sub frame period of a frame period and applies a second data signal to a data line corresponding to a second area of the display panel during a second sub frame period of the frame period, and a touch driving part which applies a touch driving signal to a touch driving line of the display panel during a first blank period next to the first sub frame period and applies the touch driving signal to the touch driving line during a second blank period next to the second sub frame period and included in the frame period.

In one embodiment, the touch driving part may sequentially apply the touch driving signal to first to N-th touch driving lines during the first blank period, and may sequentially apply the touch driving signal to the first to N-th touch driving lines during the second blank period, where N is a natural number.

In one embodiment, the display panel driving apparatus may further include a gate driving part which applies a first gate signal to a gate line disposed in the first area during the first sub frame period and applies a second gate signal to a gate line disposed in the second area during the second sub frame period, and the first area and the second area of the display panel may be determined based on a number of gate lines in the display panel.

In one embodiment, the touch driving signal may include a plurality of pulses.

In one embodiment, the data driving part may apply a third data signal to a data line corresponding to a third area of the display panel during a third sub frame period next to the second blank period and included in the frame period, and the touch driving part may apply the touch driving signal to the touch driving line during a third blank period next to the third sub frame period and included in the frame period.

In one embodiment, the frame period may include A sub frame periods and A blank periods respectively next to the A sub frame periods, where A is a natural number.

In one embodiment, the display panel may include A areas, the data driving part may apply a data signal to a data line corresponding to the A areas during the A sub frame periods, and the touch driving part may apply the touch driving signal to the touch driving line during each of the A blank periods.

According to still another exemplary embodiment of the invention, a display apparatus includes a display panel which displays an image and a display panel driving apparatus including: a data driving part which applies a first data signal to a data line corresponding to a first area of the display panel during a first sub frame period of a frame period and applies a second data signal to a data line corresponding to a second area of the display panel during a second sub frame period of the frame period; and a touch driving part which applies a touch driving signal to a touch driving line of the display panel during a first blank period next to the first sub frame period and applies the touch driving signal to the touch driving line during a second blank period next to the second sub frame period, where the second blank period is in the frame period.

In one embodiment, a signal line in the display panel may operate the touch driving line.

In one embodiment, at least one of a common electrode and a gate line may operate the touch driving line.

In one embodiment, the display panel may further include a touch sense line, the touch sense and the touch driving line may form a capacitance, and a signal line in the display panel may operate the touch sense line.

In one embodiment, at least one of a common electrode and a data line may be operate the touch sense line.

In one embodiment, the frame period may include A sub frame periods and A blank periods respectively next to the A sub frame periods, the display panel may include A areas, the data driving part may apply a data signal to a data line corresponding to the A areas during the A sub frame periods, and the touch driving part may apply the touch driving signal to the touch driving line during each of the A blank periods, where A is a natural number greater than or equal to 2.

According to an exemplary embodiment of the invention, the display panel may sense A times during a frame period, and thus a touch sense frequency of the display panel and the display apparatus is substantially increased.

In one or more exemplary embodiment, the display panel displays an image during a sub frame period and senses a touch during a blank period different from the sub frame period. In such an embodiment, a noise of a touch sense is substantially decreased and a signal to noise ratio ("SNR") of the touch sense is substantially increased

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
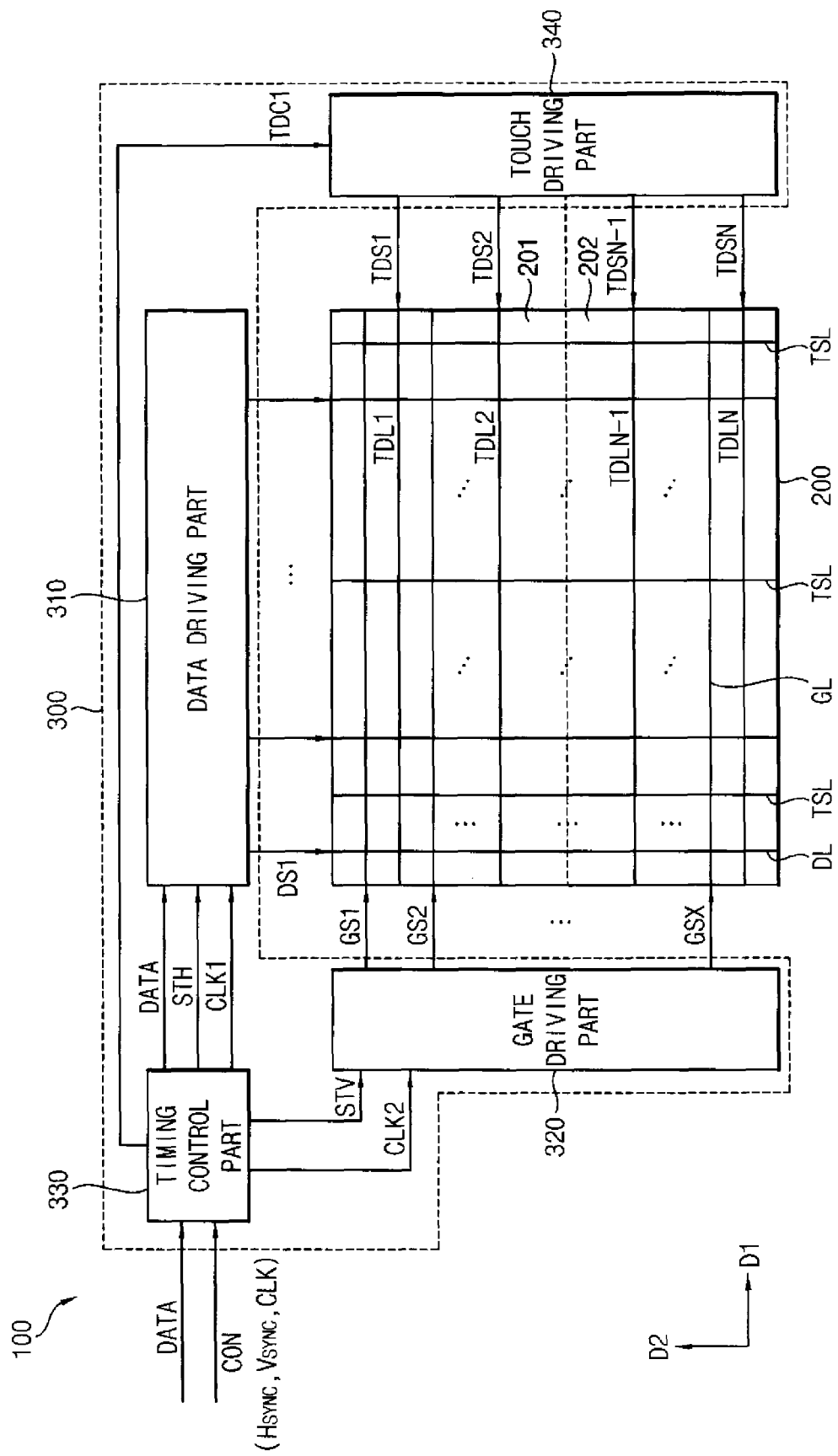
FIG. 1 is a block diagram illustrating an exemplary embodiment of a display apparatus according the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

A technical term "viewing angle" is defined as the angle between the line of sight of the viewer viewing the screen and the tangent to the intersection between the line of sight and the observed screen surface, and the difference between the center and left/right edge viewing angles is defined as and used to mean the "viewing angle difference.

Hereinafter, the invention will be explained in detail with reference to the accompanying drawings.

FIG. 1 is a block diagram illustrating a display apparatus according to an exemplary embodiment of the invention.

Referring to FIG. 1, an exemplary embodiment of the display apparatus 100 includes a display panel 200 and a display panel driving apparatus 300.

The display panel 200 receives an image data DATA to display an image. In one exemplary embodiment, for example, the image data DATA may be a two-dimensional plane image data. In such an embodiment, the image data DATA may include a left-eye image data and a right-eye image data to display a three-dimensional stereoscopic image.

The display panel 200 includes a plurality of gate lines GL extending substantially in a first direction D1, a plurality of data lines DL extending substantially in a second direction D2, which is substantially perpendicular to the first direction D1, and a plurality of pixels. The first direction D1 may be substantially parallel to a long side of the display panel 200, and the second direction D2 may be substantially parallel to a short side of the display panel 200.

Each of the pixels includes a thin-film transistor electrically connected to a corresponding gate line of the gate lines GL and a corresponding data line of the data lines DL, a liquid crystal capacitor and a storage capacitor electrically connected to the thin-film transistor.

In an exemplary embodiment, the display panel 200 includes a plurality of touch driving lines TDL1, TDL2, . . . , TDLN−1 and TDLN (N is a natural number) extending substantially in the first direction D1 and a plurality of touch sense lines TSL extending substantially in the second direction D2. In an exemplary embodiment, the touch driving lines TDL1, TDL2, . . . , TDLN−1 and TDLN may be spaced apart from each other with a predetermined interval corresponding to several numbers of gate lines GL. In an alternative exemplary embodiment, the touch driving lines TDL1, TDL2, . . . , TDLN−1 and TDLN may be spaced apart from each other, and alternately disposed with the gate lines GL along the first direction D1. In an exemplary embodiment, the touch sense lines TSL may be spaced apart from each other with a predetermined interval corresponding to several numbers of data lines DL. In an alternative exemplary embodiment, the touch sense lines TSL may be spaced apart from each other, and alternately disposed with the data lines DL.

Each of the touch driving lines TDL1, TDL2, . . . , TDLN−1 and TDLN and each of the touch sense lines TSL form a capacitance. Thus, the display panel 200 may sense a touch thereon.

In an exemplary embodiment, the display panel 200 includes a first area 201 and a second area 202. The first area 201 is disposed at an upper portion of the display panel 200 in the second direction D2, and the second area 202 is disposed at a lower portion of the display panel 200 in the second direction D2. In such an embodiment, the first area 201 and the second area 202 may be defined based on a number of the gate lines GL disposed therein, and a number of the gate lines GL disposed in the first area 201 and a number of the gate lines GL disposed in the second area 202 may be substantially the same as each other. In one exemplary embodiment, for example, the number of the gate lines GL disposed in the first area 201 may be about 384, and the number of the gate lines GL disposed in the second area 202 may be about 384, when the display panel 200 has a resolution of 1024×768.

The display panel driving apparatus 300 includes a data driving part 310, a gate driving part 320, a timing control part 330 and a touch driving part 340.

The data driving part 310 outputs data signals DS1 based on the image data DATA to the data lines DL in response to a first clock signal CLK1 and a horizontal start signal STH provided from the timing control part 330.

The gate driving part 320 generates gate signals GS1, GS2, . . . , GSX using a vertical start signal STV and a second clock signal CLK2 provided from the timing control part 330 and outputs the gate signals GS1, GS2, ..., GSX to the gate lines GL.

The timing control part 330 receives the image data DATA and a control signal CON from an outside thereof. The control signal CON may include a horizontal synchronous signal Hsync, a vertical synchronous signal Vsync and a clock signal CLK.

The timing control part 330 generates the horizontal start signal STH using the horizontal synchronous signal Hsync and outputs the horizontal start signal STH to the data driving part 310. In such an embodiment, the timing control part 330 generates the vertical start signal STV using the vertical synchronous signal Vsync and outputs the vertical start signal STV to the gate driving part 320. In such an embodiment, the timing control part 330 generates the first clock signal CLK1 and the second clock signal CLK2 using the clock signal CLK and outputs the first clock signal CLK1 to the data driving part 310 and the second clock signal CLK2 to the gate driving part 320. In such an embodiment, the timing control part 330 outputs a touch driving control signal TDC1, which controls an output of the touch driving part 340, to the touch driving part 340.

The touch driving part 340 outputs touch driving signals TDS1, TDS2, ..., TDSN-1 and TDSN to the touch driving lines TDL1, TDL2, ..., TDLN-1 and TDLN in response to the touch driving control signal TDC1 provided from the timing control part 330. In an exemplary embodiment, the touch driving part 340 outputs a first touch driving signal TDS1 to a first touch driving line TDL1, outputs a second touch driving signal TDS2 to a second touch driving line TDL2, outputs an (N-1)-th touch driving signal TDSN-1 to an (N-1)-th touch driving line TDLN-1 and outputs an N-th touch driving signal TDSN to an N-th touch driving line TDLN in response to the touch driving control signal TDC1 provided from the timing control part 330 while the gate lines GL are not driven.

Figure 2:
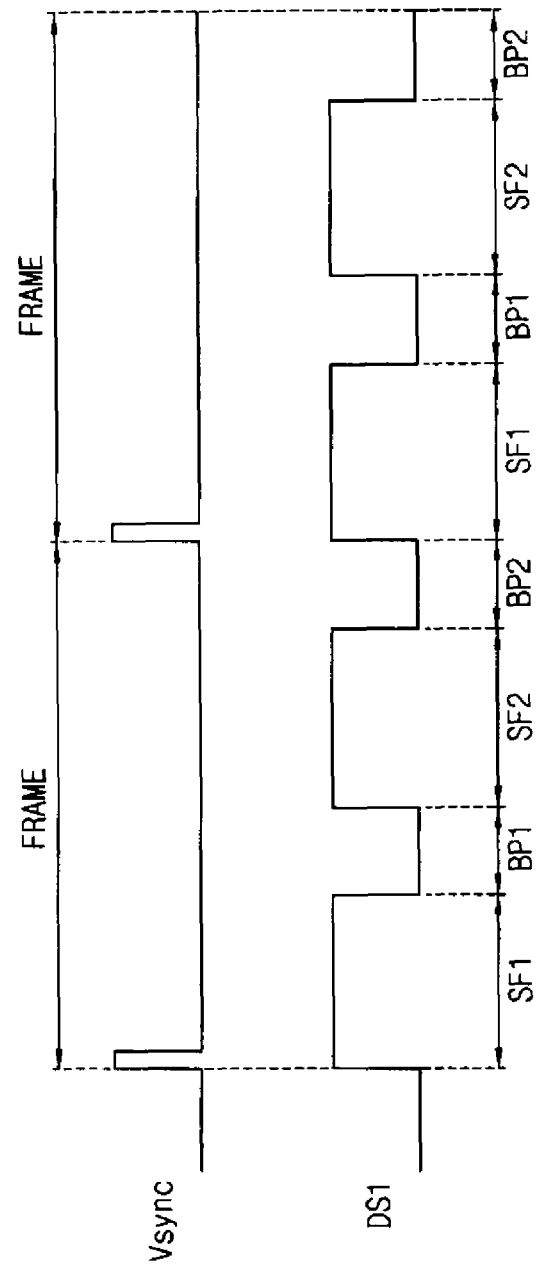
FIG. 2 is a signal timing diagram illustrating a vertical synchronous signal and a data signal of FIG. 1.
Figure 3:
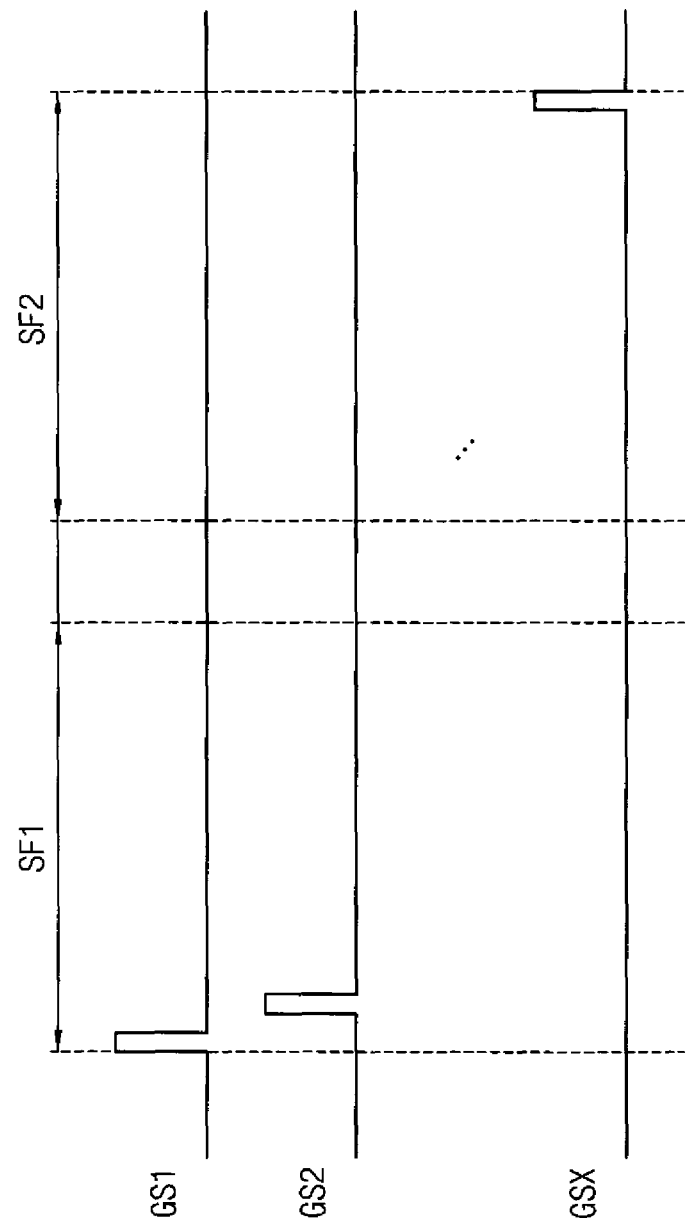
FIG. 3 is a signal timing diagram illustrating gate signals of FIG. 1.
Figure 4:
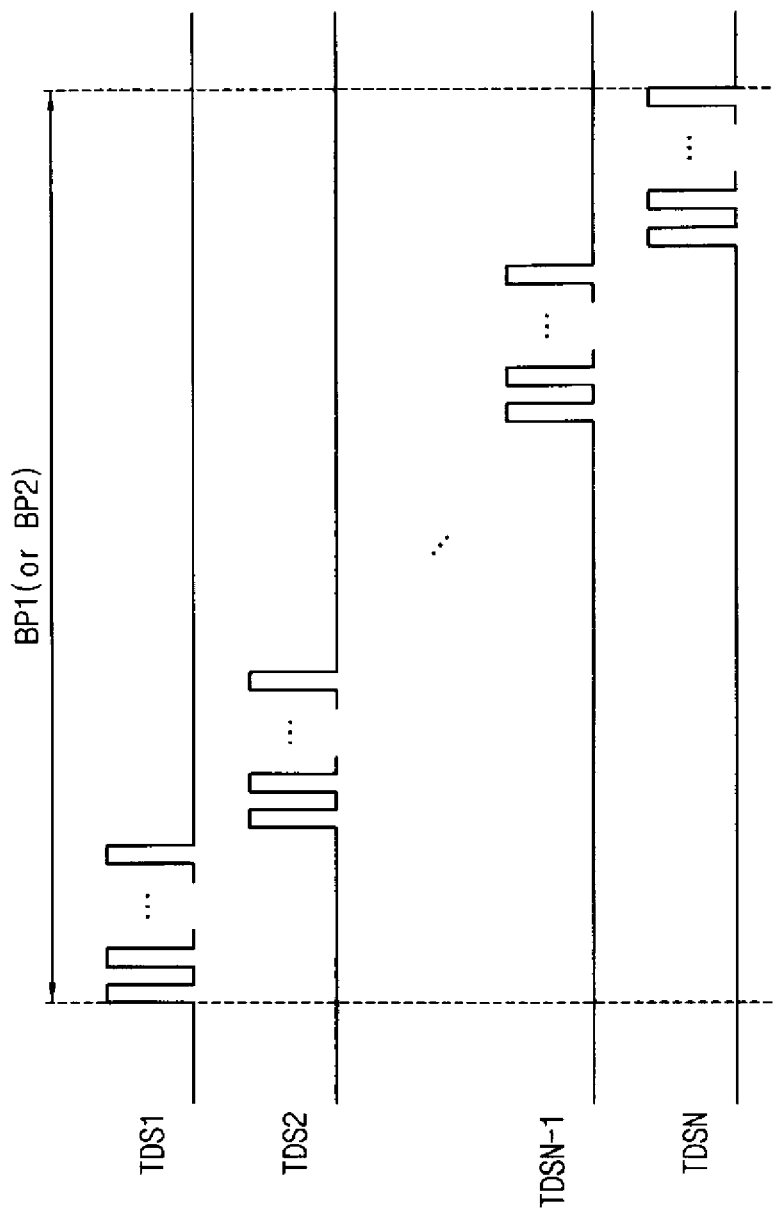
FIG. 4 is a signal timing diagram illustrating touch driving signals of FIG. 1.

FIG. 2 is a signal timing diagram illustrating the vertical synchronous signal Vsync and the data signals DS1 of FIG. 1, FIG. 3 is a signal timing diagram illustrating the gate signals GS1, GS2, ..., GSX of FIG. 1, and FIG. 4 is a signal timing diagram illustrating the touch driving signals TDS1, TDS2, ..., TDSN-1 and TDSN of FIG. 1.

Referring to FIGS. 1 to 4, a frame period FRAME includes a first sub frame period SF1, a first blank period BP1, a second sub frame period SF2 and a second blank period BP2. In one exemplary embodiment, for example, a frequency of the frame period FRAME may be about 60 hertz (Hz), and thus a period of the frame period FRAME may be about 16.6 milliseconds (ms).

The first blank period BP1 is next to the first sub frame period SF1, the second sub frame period SF2 is next to the first blank period BP1, and the second blank period BP2 is next to the second sub frame period SF2.

The data driving part 310 applies the data signals DS1 to the data lines DL in response to a pulse of the vertical synchronous signal Vsync during the first sub frame period SF1. In an exemplary embodiment, the data driving part 310 applies the data signals DS1 to the data lines DL corresponding to the first area 201 during the first sub frame period SF1. The data signals DS1 applied to the data lines DL during the first sub frame period SF1 may be referred to as first data signals.

The gate driving part 320 applies the gate signals GS1, GS2, ..., GSX to the gate lines GL in response to the vertical synchronous signal Vsync during the first sub frame period SF1. In such an embodiment, the gate lines GL disposed in the first area 201 is driven during the first sub frame period SF1. The gate signals GS1, GS2, ..., GSX applied to the gate lines GL disposed in the first area 201 during the first sub frame period SF1 may be referred to as first gate signals.

In an exemplary embodiment, the data driving part 310 applies the data signals DS1 to the data lines DL during the second sub frame period SF2. In such an embodiment, the data driving part 310 applies the data signals DS1 to the data lines DL corresponding to the second area 202 during the second sub frame period SF2. The data signals DS1 applied to the data lines DL during the second sub frame period SF2 may be referred to as second data signals.

The gate driving part 320 applies the gate signals GS1, GS2, ..., GSX to the gate lines GL during the second sub frame period SF2. In such an embodiment, the gate lines GL disposed in the second area 202 is driven during the second sub frame period SF2. The gate signals GS1, GS2, ..., GSX applied to the gate lines GL disposed in the second area 202 during the second sub frame period SF2 may be referred to as second gate signals.

The gate driving part 320 does not apply the gate signals GS1, GS2, ..., GSX to the gate lines GL during the first blank period BP1 between the first sub frame period SF1 and the second sub frame period SF2. Thus, the gate lines GL are not driven during the first blank period BP1. The data driving part 310 may apply data signals having a black grayscale or a white grayscale to the data lines DL during the first blank period BP1. In an alternative exemplary embodiment, the data driving part 310 may not apply the data signals DS1 to the data lines DL during the first blank period BP1. In such an embodiment, the data lines DL may be not driven during the first blank period BP1.

The touch driving part 340 sequentially outputs the first to N-th touch driving signals TDS1, TDS2, ..., TDSN-1 and TDSN to the first to N-th touch driving lines TDL1, TDL2, ..., TDLN-1 and TDLN during the first blank period BP1. Thus, the display panel 200 senses the touch thereon. Each of the touch driving signals TDS1, TDS2, ..., TDSN-1 and TDSN may have a plurality of pulses.

The gate driving part 320 does not apply the gate signals GS1, GS2, ..., GSX to the gate lines GL during the second blank period BP2 next to the second sub frame period SF2. Thus, the gate lines GL are not driven during the second blank period BP2. The data driving part 310 may apply data signals having the black grayscale or the white grayscale to the data lines DL during the second blank period BP2. In an alternative exemplary embodiment, the data driving part 310 may not apply the data signals DS1 to the data lines DL during the second blank period BP2. In such an embodiment, the data lines DL may be not driven during the second blank period BP2.

The touch driving part 340 sequentially outputs the first to N-th touch driving signals TDS1, TDS2, ..., TDSN-1 and TDSN to the first to N-th touch driving lines TDL1, TDL2, ..., TDLN-1 and TDLN during the second blank period BP2. Thus, the display panel 200 senses the touch thereon. Each of the touch driving signals TDS1, TDS2, ..., TDSN-1 and TDSN may have a plurality of pulses.

In an exemplary embodiment, the touch driving signals TDS1, TDS2, ..., TDSN-1 and TDSN are applied to the touch driving lines TDL1, TDL2, ..., TDLN-1 and TDLN twice during the frame period FRAME, and thus the display panel 200 senses the touch twice. In such an embodiment, a touch sense frequency of the display panel 200 is about 120 Hz, when a driving frequency of the display panel 200 is about 60 Hz.

Figure 5:
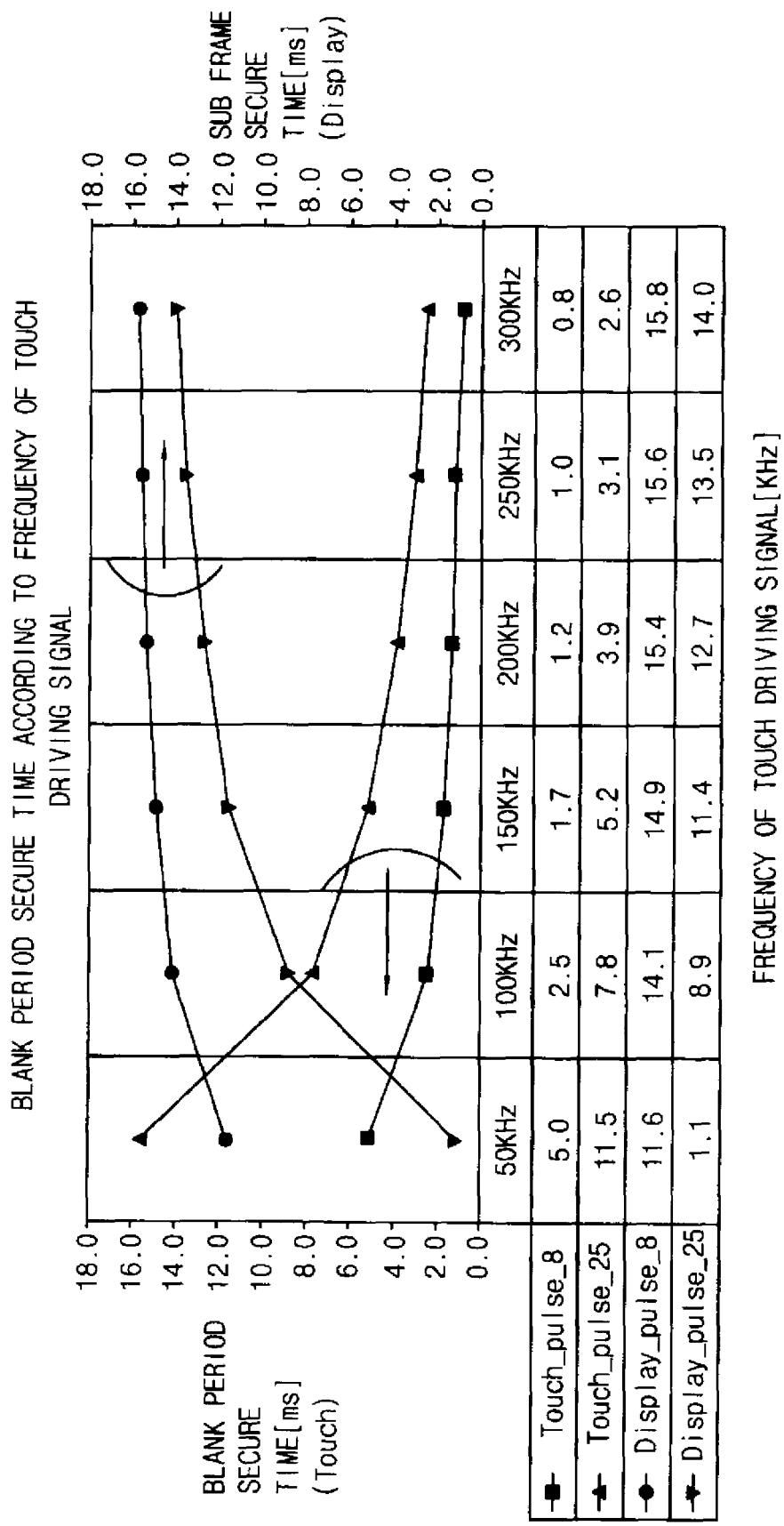
FIG. 5 is a graph illustrating a blank period secure time (millisecond: ms) according to a frequency of the touch driving signals (kilohertz: KHz)

FIG. 5 is a graph illustrating a blank period secure time (ms) according to a frequency (kilohertz: KHz) of the touch driving signals TDS1, TDS2, . . . , TDSN−1 and TDSN.

Table 1 illustrates the blank period secure time according to a number of the pulse in each of the touch driving signals TDS1, TDS2, . . . , TDSN−1 and TDSN.

TABLE 1

|  | Number of pulse in touch driving signal | |
| --- | --- | --- |
|  | Case 1 | Case 2 |
|  | 25 | 8 |
| Number of touch driving line | 31 | |
| Blank period secure time [ms] (In a case that touch driving frequency is about 100 KHz) | 7.8 | 2.5 |

Referring to FIGS. 1 to 5 and Table 1, the driving frequency of the display panel 200 is about 60 Hz, and the driving period of the display panel 200 is about 16.6 ms. Thus, a sum of a sub frame period time corresponding to the first and second sub frame periods SF1 and SF2 and the blank period secure time corresponding to the first and second blank periods BP1 and BP2 is about 16.6 ms.

As shown in FIG. 5 and Table 1, the blank period secure time was about 7.8 ms in Case 1 where each of the touch driving signals TDS1, TDS2, . . . , TDSN−1 and TDSN has about 25 pulses (Touch_pulse_25), and the blank period secure time was about 2.5 ms in Case 2 where each of the touch driving signals TDS1, TDS2, . . . , TDSN−1 and TDSN has about 8 pulses (Touch_pulse_8), when the frequency of each of the touch driving signals TDS1, TDS2, . . . , TDSN−1 and TDSN is about 100 KHz.

As shown in FIG. 5, the blank period secure time was about 3.1 ms in Case 1 where each of the touch driving signals TDS1, TDS2, . . . , TDSN−1 and TDSN has about 25 pulses (Touch_pulse_25), and the blank period secure time was about 1.0 ms in Case 2 where each of the touch driving signals TDS1, TDS2, . . . , TDSN−1 and TDSN has about 8 pulses (Touch_pulse_8), when the frequency of each of the touch driving signals TDS1, TDS2, . . . , TDSN−1 and TDSN is about 250 KHz.

A signal to noise ratio ("SNR") of a touch sense may be increased as the number of the pulses in each of the touch driving signals TDS1, TDS2, . . . , TDSN−1 and TDSN is increased. In such an embodiment, as the number of the pulses in each of the touch driving signals TDS1, TDS2, . . . , TDSN−1 and TDSN is increased, the blank period secure time is increased, and the sub frame period time is thereby decreased.

In an exemplary embodiment, the frequency of each of the touch driving signals TDS1, TDS2, . . . , TDSN−1 and TDSN may be about 150 KHz to about 200 KHz to effectively prevent a decline of a quality of the image displayed on the display panel 200 due to a decrease of the sub frame period time and to effectively prevent a decline of an accuracy of the touch sense of the display panel 200.

Table 2 illustrates the number of the vertical blank lines for calculating the blank period secure time, when a size of the display panel 200 of FIG. 1 is about 10.1 inches and the display panel 200 has a resolution of wide extended graphics array ("WXGA") (1280×800).

TABLE 2

| Test | Pixel Frequency [Hz] | Number of horizontal blank line | Number of vertical blank line | State |
| --- | --- | --- | --- | --- |
| Default | 70 | 128 | 32 | Good |
| Test 1 | 65 | 32 | 32 | Bad: Driving is impossible |
| Test 2 | 67 | 64 | 32 | Bad: Driving is impossible |
| Test 3 | 68 | 96 | 32 | Bad: Driving is impossible |
| Test 4 | 73 | 128 | 64 | Good |
| Test 5 | 75 | 128 | 96 | Good |
| Test 6 | 78 | 128 | 128 | Good |
| Test 7 | 79.5 | 128 | 142 | Bad: Driving is possible, color expression is poor |
| Test 8 | 81 | 128 | 160 | Bad: Driving is possible, color expression is poor |

Referring to Table 2, in an exemplary embodiment, the number of the vertical blank lines may be about 128 such that the decline of the quality of the image displayed on the display panel 200 and the decline the accuracy of the touch sense of the display panel 200 are effectively prevented.

The blank period secure time is calculated using the following Equation 1.

$$BP = T/(G+VBL) \times VBL \qquad <\text{Equation 1}>$$

In Equation 1, BP denotes blank period secure time, G denotes number of gate line, VBL denotes number of vertical blank line, and T denotes period of frame.

According to the Equation 1, the blank period secure time was about 2.28 ms.

In an alternative exemplary embodiment, the number of the vertical blank line may be about 678 and the blank period secure time may be about 7.8 ms, when the size of the display panel 200 is about 9.7 inches, the display panel 200 has a resolution of extended graphics array ("XGA") (1024×768) and the frequency of the display panel 200 is about 60 Hz.

Figure 6:
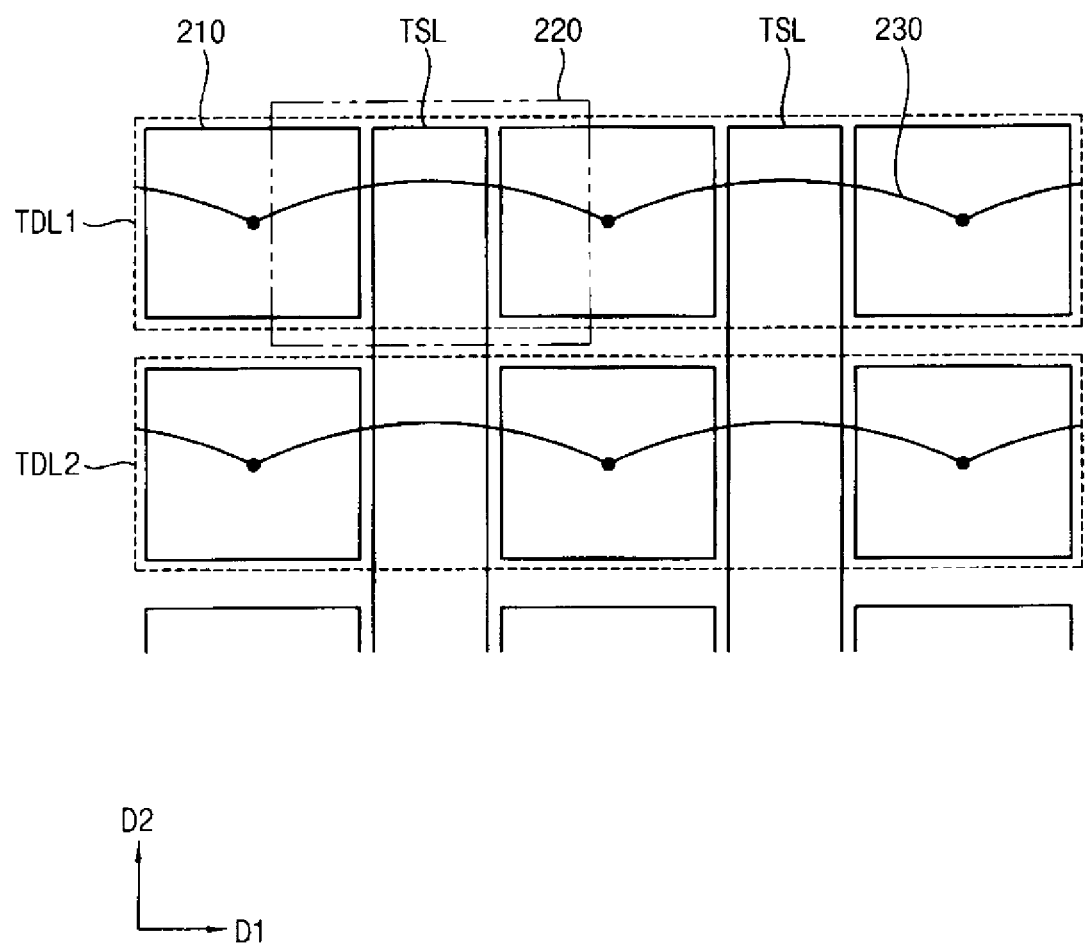
FIG. 6 is an enlarged view of a portion of a display panel 200 in FIG. 1.

FIG. 6 is an enlarged view of a portion of the display panel 200 in FIG. 1.

Referring to FIGS. 1 and 6, each of the touch driving lines TDL1, TDL2, . . . , TDLN−1 and TDLN includes a plurality of driving segments 210 and a segment link 230.

The driving segments 210 are spaced apart from each other in the first direction D1. The touch sense line TSL is disposed between the driving segments 210. The driving segments 210 and the touch sense line TSL define a touch pixel 220.

Figure 7:
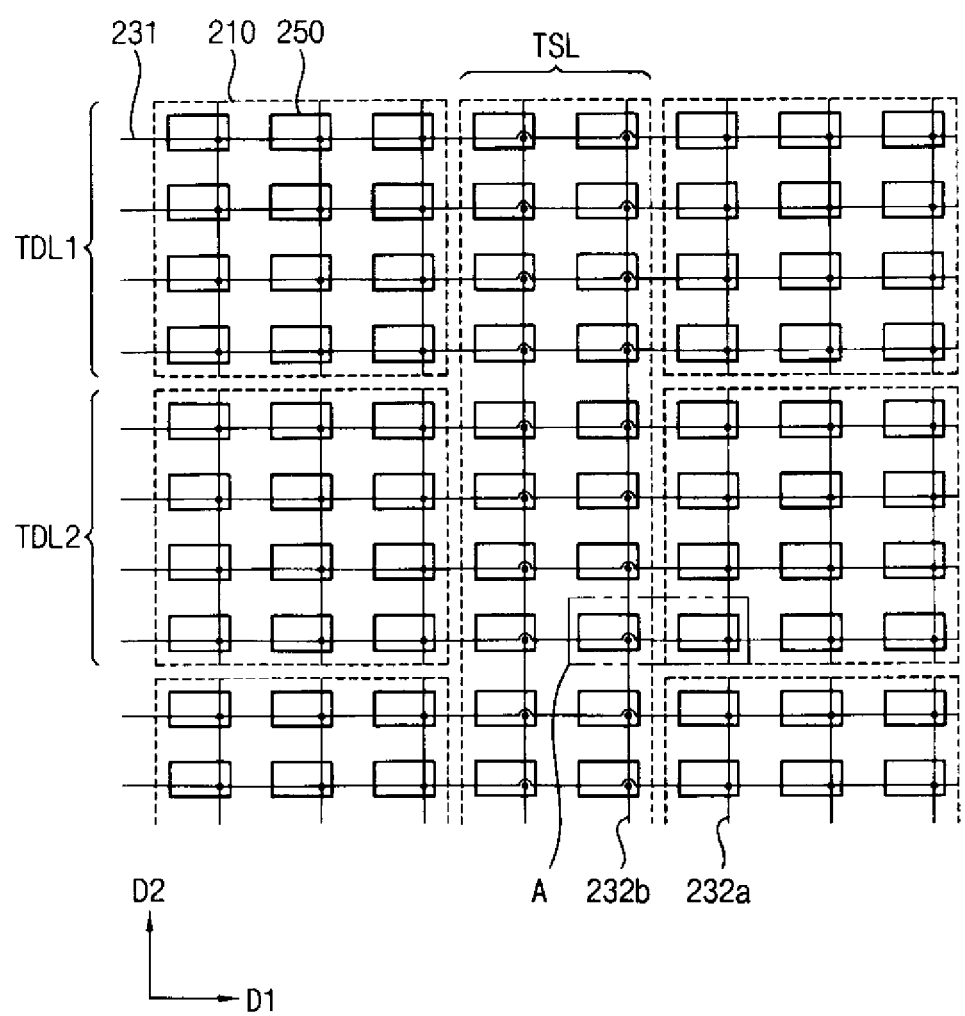
FIG. 7 is an enlarged view of a first touch driving line, a second touch driving line and a touch sense line of FIG. 6.

FIG. 7 is an enlarged view of a first touch driving line TDL1, a second touch driving line TDL2 and the touch sense line TSL of FIG. 6.

Referring to FIGS. 1, 6 and 7, each of the driving segments 210 includes a plurality of common electrodes 250. In one exemplary embodiment, for example, the number of the common electrodes 250 in each of the driving segments 210 may be B×C (B and C are natural numbers). The common electrodes 250 in each of the driving segments 210 are connected to each other through a horizontal common electrode line 231, which extends in the first direction D1, and a first vertical common electrode line 232a, which extends in the second direction D2. The first vertical common electrode line 232a is disconnected between the driving segments 210 in the second direction D2. Each of the first touch driving line TDL1 and the second touch driving line TDL2 includes the common electrode 250, a plurality of the horizontal common electrode lines 231 and a plurality of the first vertical common electrode lines 232a.

The touch sense line TSL includes the common electrodes 250 and a second vertical common electrode line 232b. In one exemplary embodiment, for example, the number of the common electrodes 250 in the touch sense line TSL may be D×E (D and E are natural numbers). The common electrodes 250 in the touch sense line TSL are connected to each other through the second vertical common electrode line 232b, which extends in the second direction D2.

Figure 8:
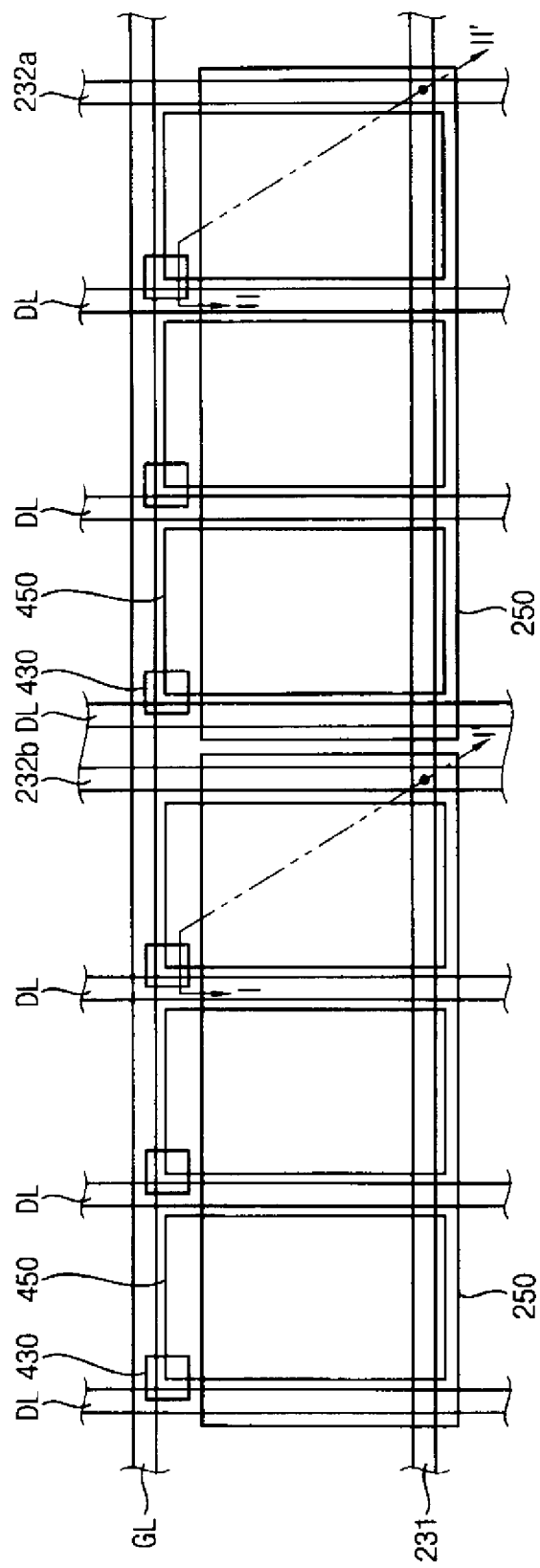
FIG. 8 is an enlarged view of a portion 'A' of FIG. 7.
Figure 9:
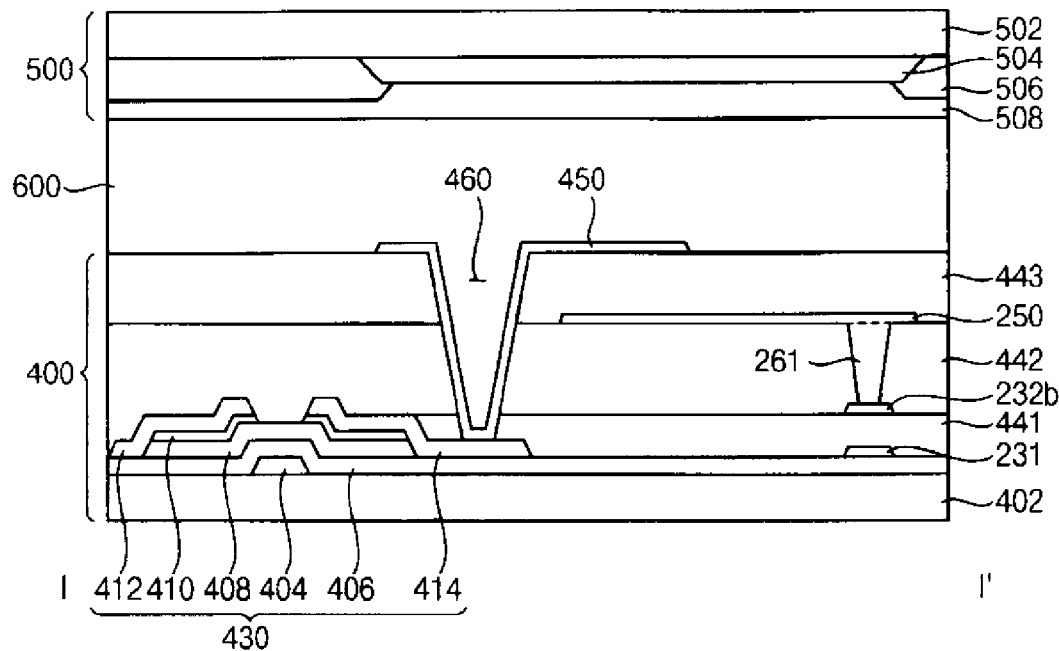
FIG. 9 is a cross-sectional view taken along line I-I' of FIG. 8.
Figure 10:
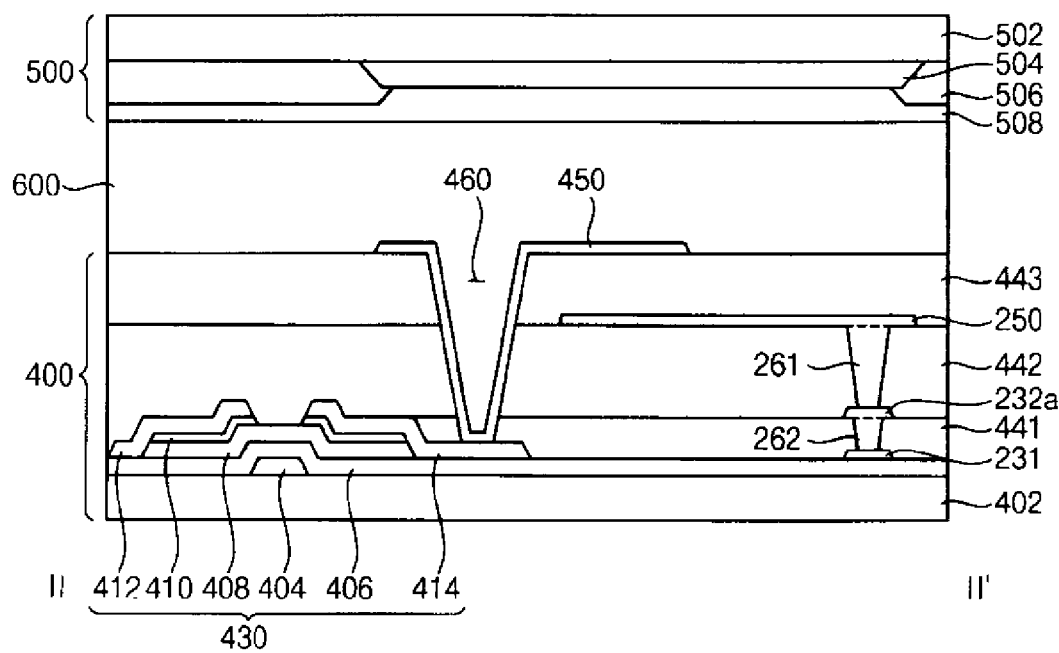
FIG. 10 is a cross-sectional view taken along line II-II' of FIG. 8.

FIG. 8 is an enlarged view of a portion 'A' of FIG. 7, FIG. 9 is a cross-sectional view taken along line I-I' of FIG. 8, and FIG. 10 is a cross-sectional view taken along line II-II' of FIG. 8.

Referring to FIGS. 1, 6 to 10, the display panel 200 includes a lower substrate 400, an upper substrate 500 and a liquid crystal layer 600.

The lower substrate 400 includes a first base substrate 402, the gate lines GL, the data lines DL and the thin-film transistor 430 disposed on the first base substrate 402, the horizontal common electrode line 231 disposed on a gate insulating layer 406 of the thin-film transistor 430, a first insulating layer 441 disposed on the horizontal common electrode line 231, the first and second vertical common electrode lines 232a and 232b, a second insulating layer 442 disposed on the first and second vertical common electrode lines 232a and 232b and the thin-film transistor 430, the common electrode 250 disposed on the second insulating layer 442, a third insulating layer 443 disposed on the common electrode 250, and a pixel electrode 450 disposed on the third insulating layer 443 and electrically connected to a drain electrode 414 of the thin-film transistor 430 through a contact hole 460 formed through the first insulating layer 441, the second insulating layer 442 and the third insulating layer 443.

The thin-film transistor 430 includes a gate electrode 404 disposed on the first base substrate 402 and protruded from the gate line GL, the gate insulating layer 406 disposed on the gate electrode 404, an active layer 408 disposed on the gate insulating layer 406, an ohmic-contact layer 410 separately disposed on the active layer 408, a source electrode 412 disposed on the ohmic-contact layer 410 and protruded from the data line DL, and the drain electrode 414 disposed on the ohmic-contact layer 410 and spaced apart from the source electrode 412.

The common electrode 250 in the driving segment 210 is electrically connected to the first vertical common electrode line 232a through a first via hole 261 and electrically connected to the horizontal common electrode line 231 through a second via hole 262. The common electrode 250 in the touch sense line TSL is electrically connected with the second vertical common electrode line 232b through the first via hole 261 and the common electrode 250 in the touch sense line TSL is not electrically connected to, e.g., insulated from, the horizontal common electrode line 231.

The upper substrate 500 includes a second base substrate 502 disposed opposite to, e.g., facing, the first base substrate 402, a color filter layer 504 and a light shielding layer 506 disposed on the second base substrate 502, and an overcoating layer 508 disposed on the color filter layer 504 and the light shielding layer 506.

The liquid crystal layer 600 is interposed between the lower substrate 400 and the upper substrate 500, and includes a liquid crystal, an alignment of which is changed by an electric field between the pixel electrode 450 and the common electrode 250.

Figure 11:
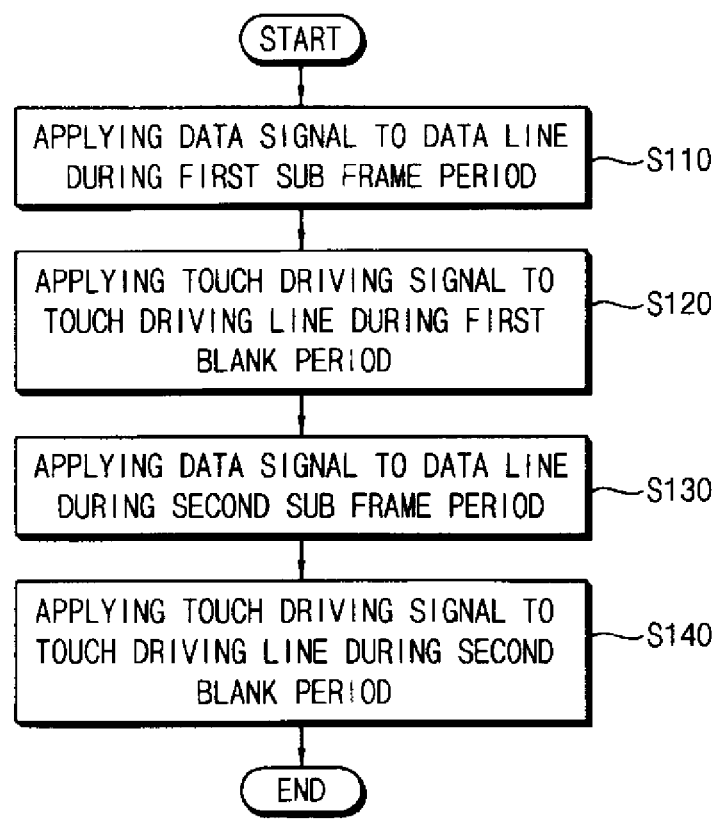
FIG. 11 is a flow chart illustrating an exemplary embodiment of a method of driving a display panel performed by a display panel driving apparatus of FIG. 1.

FIG. 11 is a flow chart illustrating an exemplary embodiment of a method of driving a display panel performed by the display panel driving apparatus 300 of FIG. 1.

Referring to FIGS. 1 to 5 and 11, the data signals DS1 is applied to the data lines DL during the first sub frame period SF1 (S110). The gate driving part 320 applies the gate signals GS1, GS2, . . . , GSX to the gate lines GL disposed in the first area 201, and the data driving part 310 applies the data signals DS1 to the data lines DL corresponding to the first area 201 during the first sub frame period SF1, in response to the vertical synchronous signal Vsync.

The touch driving signals TDS1, TDS2, . . . , TDSN−1 and TDSN are applied to the touch driving lines TDL1, TDL2, . . . , TDLN−1 and TDLN during the first blank period BP1 (S120). The first blank period BP1 is next to the first sub frame period SF1, and the gate driving part 320 does not apply the gate signals GS1, GS2, . . . , GSX to the gate lines GL during the first blank period BP1. The touch driving part 340 sequentially outputs the touch driving signals TDS1, TDS2, . . . , TDSN−1 and TDSN to the touch driving lines TDL1, TDL2, . . . , TDLN−1 and TDLN during the first blank period BP1. Thus, the display panel 200 senses the touch thereon.

The data signals DS1 is applied to the data lines DL during the second sub frame period SF2 (S130). The second sub frame period SF2 is next to the first blank period BP1. The gate driving part 320 applies the gate signals GS1, GS2, . . . , GSX to the gate lines GL disposed in the second area 202 and the data driving part 310 applies the data signals DS1 to the data lines DL corresponding to the second area 202 during the second sub frame period SF2.

The touch driving signals TDS1, TDS2, . . . , TDSN−1 and TDSN are applied to the touch driving lines TDL1, TDL2, . . . , TDLN−1 and TDLN during the second blank period BP2 (S140). The second blank period BP2 is next to the second sub frame period SF2, and the gate driving part 320 does not apply the gate signals GS1, GS2, . . . , GSX to the gate lines GL during the second blank period BP2. The touch driving part 340 sequentially outputs the touch driving signals TDS1, TDS2, . . . , TDSN−1 and TDSN to the touch driving lines TDL1, TDL2, . . . , TDLN−1 and TDLN during the second blank period BP2. Thus, the display panel 200 senses the touch thereon.

In an exemplary embodiment, the common electrodes 250 operate as each of the touch driving lines TDL1, TDL2, . . . , TDLN−1 and TDLN and each of the touch sense lines TSL, but not being limited thereto. In an exemplary embodiment, at least one of elements, e.g., a signal line, in the display panel 200 may operate as each of the touch driving lines TDL1, TDL2, . . . , TDLN−1 and TDLN and each of the touch sense lines TSL. In one exemplary embodiment, for example, the gate lines GL may operate as each of the touch driving lines TDL1, TDL2, . . . , TDLN−1 and TDLN and the data lines DL may operate as the touch sense lines TSL.

According to an exemplary embodiment, the frame period FRAME includes the first blank period BP1 and the second blank period BP2, and the touch driving signals TDS1, TDS2, . . . , TDSN−1 and TDSN are applied to the touch driving lines TDL1, TDL2, . . . , TDLN−1 and TDLN of the display panel 200 during each of the first blank period BP1 and the second blank period BP2. In such an embodiment, the touch sense frequency of the display panel 200 is twice the driving frequency of the display panel 200, and the touch sense frequency of the display panel 200 is thereby substantially increased.

In an exemplary embodiment, the display panel 200 displays the image during the first sub frame period SF1 and the second sub frame period SF2, and senses the touch during each of the first blank period BP1 and the second blank period BP2, which are different from the first sub frame period SF1 and the second sub frame period SF2, such that a noise of the touch sense is substantially decreased, and the SNR of the touch sense is substantially increased.

Figure 12:
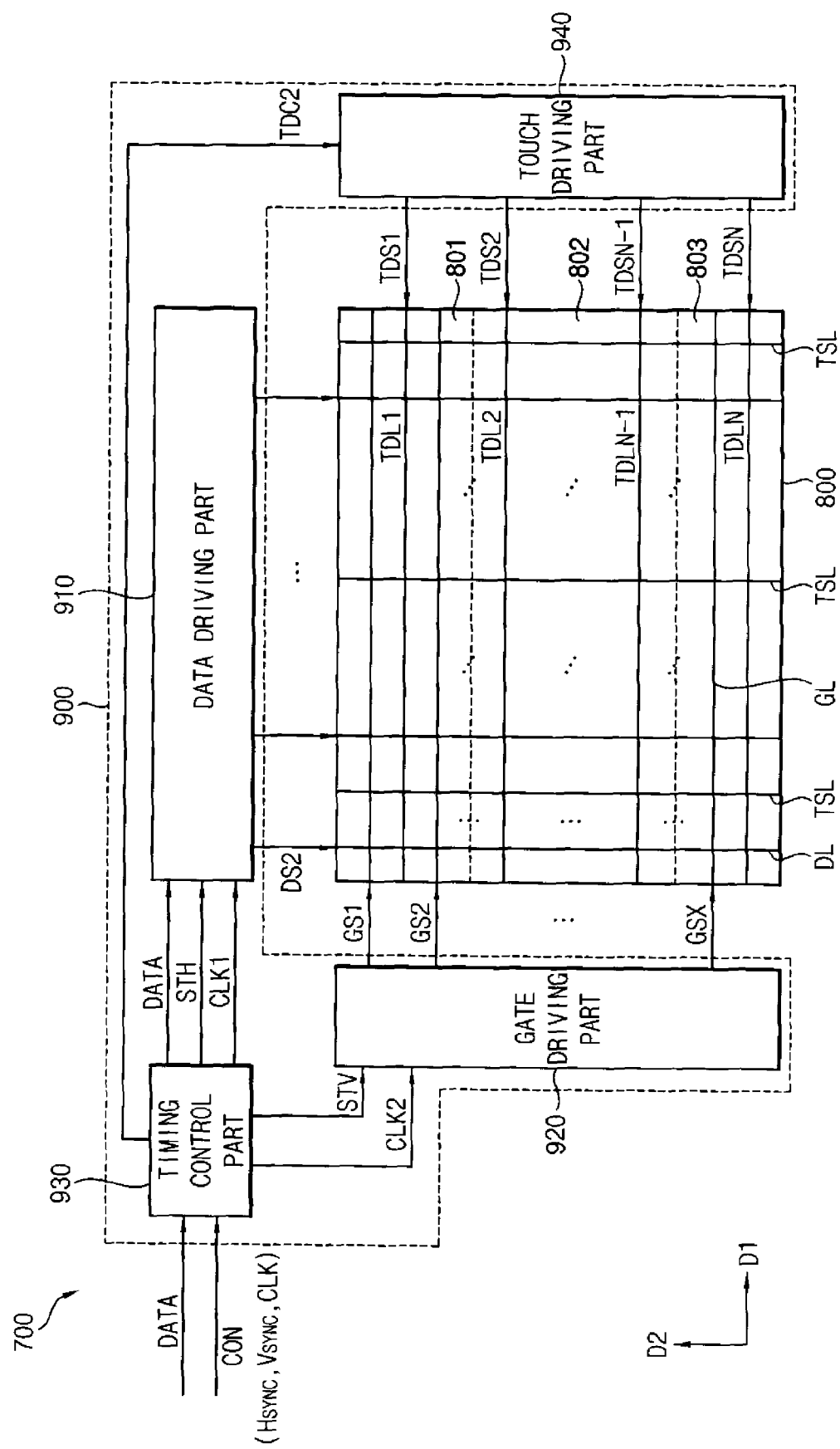
FIG. 12 is a block diagram illustrating an alternative exemplary embodiment of a display apparatus according to the invention.

FIG. 12 is a block diagram illustrating an alternative exemplary embodiment of a display apparatus according to the invention.

Referring to FIG. 12, an alternative exemplary embodiment of the display apparatus 700 includes a display panel 800 and a display panel driving apparatus 900.

The display panel 800 receives an image data DATA to display an image. The display panel 800 includes a plurality of gate lines GL extending substantially in a first direction D1, a plurality of data lines DL extending substantially in a second direction D2, which is substantially perpendicular to the first direction D1, and a plurality of pixels.

In such an embodiment, the display panel 800 includes a plurality of touch driving lines TDL1, TDL2, . . . , TDLN−1 and TDLN (N is a natural number) extending substantially in the first direction D1 and a plurality of touch sense lines TSL extending substantially in the second direction D2. Each of the touch driving lines TDL1, TDL2, . . . , TDLN−1 and TDLN and each of the touch sense lines TSL form a capacitance. Thus, the display panel 800 may sense a touch thereon.

In an exemplary embodiment, at least one of elements, e.g., a signal line, in the display panel 800 may operate as each of the touch driving lines TDL1, TDL2, . . . , TDLN−1 and TDLN and each of the touch sense lines TSL. In one exemplary embodiment, for example, the gate lines GL may operate as each of the touch driving lines TDL1, TDL2, . . . , TDLN−1, and the data lines DL may operate as each of the touch sense lines TSL. In an alternative exemplary embodiment, the common electrodes 250 may operate each of the touch driving lines TDL1, TDL2, . . . , TDLN−1 and TDLN and each of the touch sense lines TSL as illustrated in FIG. 6.

In an exemplary embodiment, the display panel 800 includes a first area 801, a second area 802 and a third area 803. The first area 801 is disposed at an upper portion of the display panel 800, the second area 802 is disposed at a middle portion of the display panel 800, and the third area 803 is disposed at a lower portion of the display panel 800, in the second direction D2. In an exemplary embodiment, the first area 801, the second area 802 and the third area 803 may be divided based on a number of the gate lines GL, and a number of the gate lines GL disposed in the first area 801, a number of the gate lines GL disposed in the second area 802 and a number of the gate lines GL disposed in the second area 803 may be substantially the same as each other. In one exemplary embodiment, for example, the number of the gate lines GL disposed in the first area 801 may be about 256, the number of the gate lines GL disposed in the second area 802 may be about 256 and the number of the gate lines GL disposed in the third area 803 may be about 256, when the display panel 800 has a resolution of 1024×768.

The display panel driving apparatus 900 includes a data driving part 910, a gate driving part 920, a timing control part 930 and a touch driving part 940.

The data driving part 910 outputs data signals DS2 based on the image data DATA to the data lines DL in response to a first clock signal CLK1 and a horizontal start signal STH provided from the timing control part 930.

The gate driving part 920 generates gate signals GS1, GS2, . . . , GSX using a vertical start signal STV and a second clock signal CLK2 provided from the timing control part 930 and outputs the gate signals GS1, GS2, . . . , GSX to the gate lines GL.

The timing control part 930 receives the image data DATA and a control signal CON from an outside. The control signal CON may include a horizontal synchronous signal Hsync, a vertical synchronous signal Vsync and a clock signal CLK.

The timing control part 930 generates the horizontal start signal STH using the horizontal synchronous signal Hsync and outputs the horizontal start signal STH to the data driving part 910. The timing control part 930 generates the vertical start signal STV using the vertical synchronous signal Vsync and outputs the vertical start signal STV to the gate driving part 920. The timing control part 930 generates the first clock signal CLK1 and the second clock signal CLK2 using the clock signal CLK and outputs the first clock signal CLK1 to the data driving part 910 and the second clock signal CLK2 to the gate driving part 920. The timing control part 930 outputs a touch driving control signal TDC2 for controlling an output of the touch driving part 940 to the touch driving part 940.

The touch driving part 940 outputs touch driving signals TDS1, TDS2, . . . , TDSN−1 and TDSN to the touch driving lines TDL1, TDL2, . . . , TDLN−1 and TDLN in response to the touch driving control signal TDC2 provided from the timing control part 930. In an exemplary embodiment, the touch driving part 940 outputs a first touch driving signal TDS1 to a first touch driving line TDL1, outputs a second touch driving signal TDS2 to a second touch driving line TDL2, outputs an (N−1)-th touch driving signal TDSN−1 to an (N−1)-th touch driving line TDLN−1 and outputs an N-th touch driving signal TDSN to an N-th touch driving line TDLN in response to the touch driving control signal TDC2 provided from the timing control part 930 while the gate lines GL are not driven.

Figure 13:
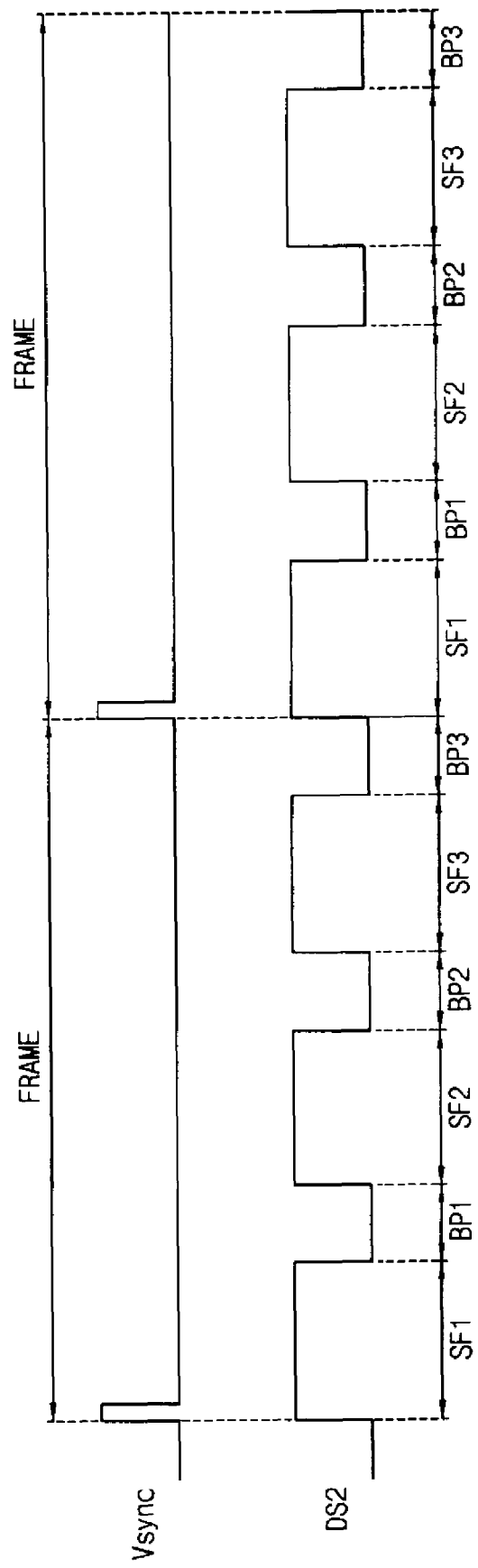
FIG. 13 is a signal timing diagram illustrating a vertical synchronous signal and a data signal of FIG. 12.
Figure 14:
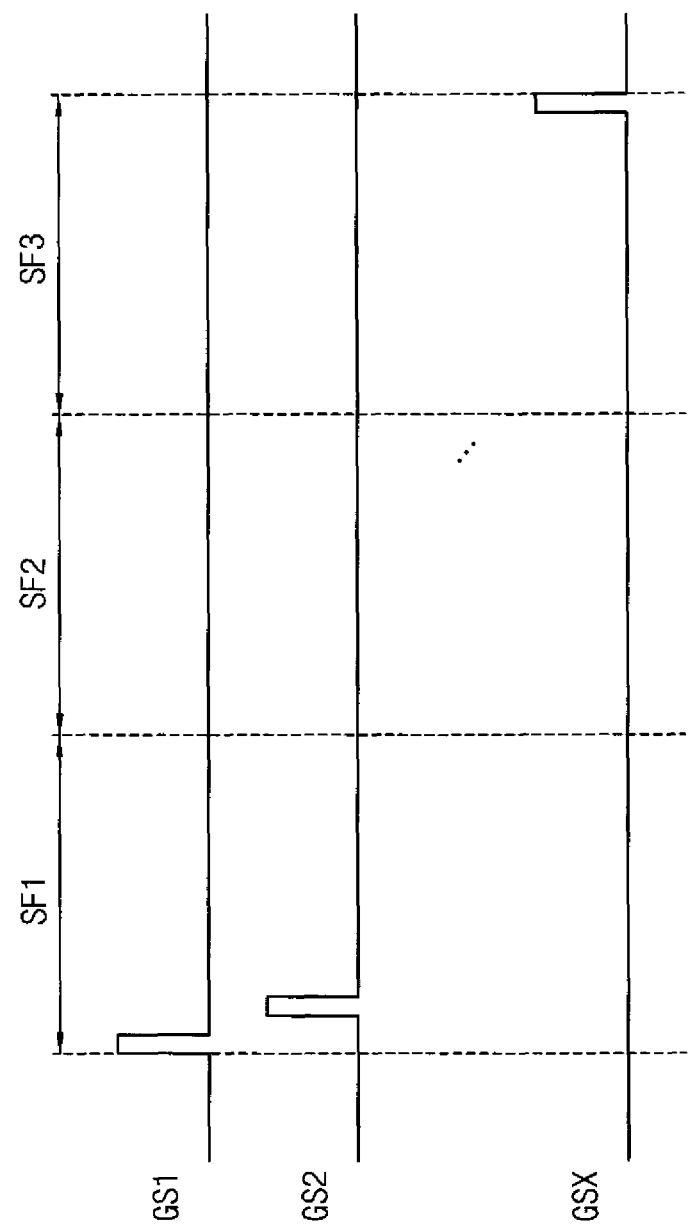
FIG. 14 is a signal timing diagram illustrating gate signals of FIG. 12.
Figure 15:
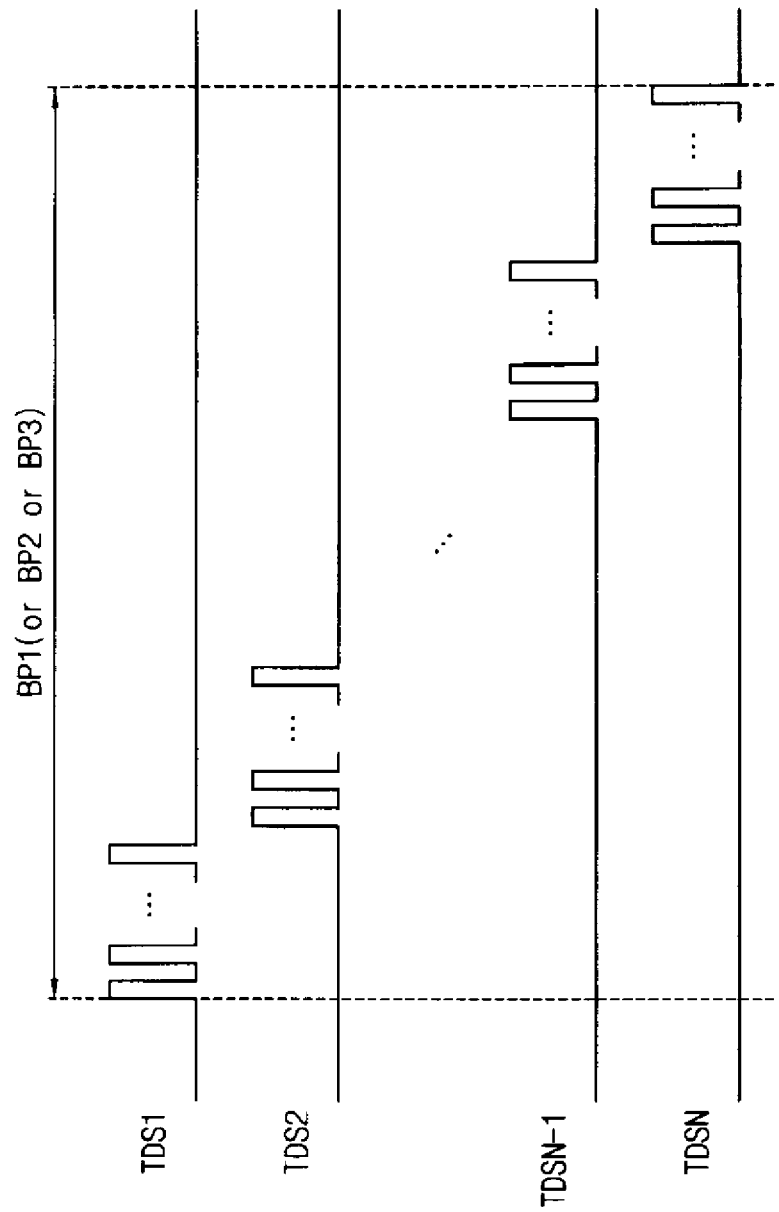
FIG. 15 is a signal timing diagram illustrating touch driving signals of FIG. 12.

FIG. 13 is a signal timing diagram illustrating the vertical synchronous signal Vsync and the data signals DS2 of FIG. 12, FIG. 14 is a signal timing diagram illustrating the gate signals GS1, GS2, . . . , GSX of FIG. 12, and FIG. 15 is a signal timing diagram illustrating the touch driving signals TDS1, TDS2, . . . , TDSN−1 and TDSN of FIG. 12.

Referring to FIGS. 12 to 15, a frame period FRAME includes a first sub frame period SF1, a first blank period BP1, a second sub frame period SF2, a second blank period BP2, a third frame period SF3 and a third blank period BP3. In one exemplary embodiment, for example, a frequency of the frame period FRAME may be about 60 Hz, and thus a period of the frame period FRAME may be about 16.6 ms.

The first blank period BP1 is next to the first sub frame period SF1, the second sub frame period SF2 is next to the first blank period BP1, the second blank period BP2 is next to the second sub frame period SF2, the third sub frame period SF3 is next to the second blank period BP2, and the third blank period BP3 is next to the third sub frame period SF3.

The data driving part 910 applies the data signals DS2 to the data lines DL in response to a pulse of the vertical synchronous signal Vsync during the first sub frame period SF1. In an exemplary embodiment, the data driving part 910 applies the data signals DS2 to the data lines DL corresponding to the first area 801 during the first sub frame period SF1. The data signals DS2 applied to the data lines DL during the first sub frame period SF1 may be first data signals.

The gate driving part 920 applies the gate signals GS1, GS2, . . . , GSX to the gate lines GL in response to the vertical synchronous signal Vsync during the first sub frame period SF1. In an exemplary embodiment, the gate lines GL disposed in the first area 801 is driven during the first sub frame period SF1. The gate signals GS1, GS2, . . . , GSX applied to the gate lines GL disposed in the first area 801 during the first sub frame period SF1 may be referred to as first gate signals.

In an exemplary embodiment, the data driving part 910 applies the data signals DS2 to the data lines DL during the second sub frame period SF2. In such an embodiment, the data driving part 910 applies the data signals DS2 to the data lines DL corresponding to the second area 802 during the second sub frame period SF2. The data signals DS2 applied to the data lines DL during the second sub frame period SF2 may be referred to as second data signals.

The gate driving part 920 applies the gate signals GS1, GS2, ..., GSX to the gate lines GL during the second sub frame period SF2. In such an embodiment, the gate lines GL disposed in the second area 802 is driven during the second sub frame period SF2. The gate signals GS1, GS2, ..., GSX applied to the gate lines GL disposed in the second area 802 during the second sub frame period SF2 may be referred to as second gate signals.

The data driving part 910 applies the data signals DS2 to the data lines DL during the third sub frame period SF3. In such an embodiment, the data driving part 910 applies the data signals DS2 to the data lines DL corresponding to the third area 803 during the third sub frame period SF3. The data signals DS2 applied to the data lines DL during the third sub frame period SF3 may be referred to as third data signals.

The gate driving part 920 applies the gate signals GS1, GS2, ..., GSX to the gate lines GL during the third sub frame period SF3. In such an embodiment, the gate lines GL disposed in the third area 803 is driven during the third sub frame period SF3. The gate signals GS1, GS2, ..., GSX applied to the gate lines GL disposed in the third area 803 during the third sub frame period SF3 may be referred to as third gate signals.

The touch driving part 940 sequentially outputs the first to N-th touch driving signals TDS1, TDS2, ..., TDSN-1 and TDSN to the first to N-th touch driving lines TDL1, TDL2, ..., TDLN-1 and TDLN during the first blank period BP1. Thus, the display panel 800 senses the touch thereon. Each of the touch driving signals TDS1, TDS2, ..., TDSN-1 and TDSN may have a plurality of pulses.

The touch driving part 940 sequentially outputs the first to N-th touch driving signals TDS1, TDS2, ..., TDSN-1 and TDSN to the first to N-th touch driving lines TDL1, TDL2, ..., TDLN-1 and TDLN during the second blank period BP2. Thus, the display panel 800 senses the touch thereon. Each of the touch driving signals TDS1, TDS2, ..., TDSN-1 and TDSN may have a plurality of pulses.

The touch driving part 940 sequentially outputs the first to N-th touch driving signals TDS1, TDS2, ..., TDSN-1 and TDSN to the first to N-th touch driving lines TDL1, TDL2, ..., TDLN-1 and TDLN during the third blank period BP3. Thus, the display panel 800 senses the touch thereon. Each of the touch driving signals TDS1, TDS2, ..., TDSN-1 and TDSN may have a plurality of pulses.

The touch driving signals TDS1, TDS2, ..., TDSN-1 and TDSN are applied to the touch driving lines TDL1, TDL2, ..., TDLN-1 and TDLN three times during the frame period FRAME, and thus the display panel 800 senses the touch three times. Thus, a touch sense frequency of the display panel 800 may be about 180 Hz, when a driving frequency of the display panel 800 is about 60 Hz.

Figure 16:
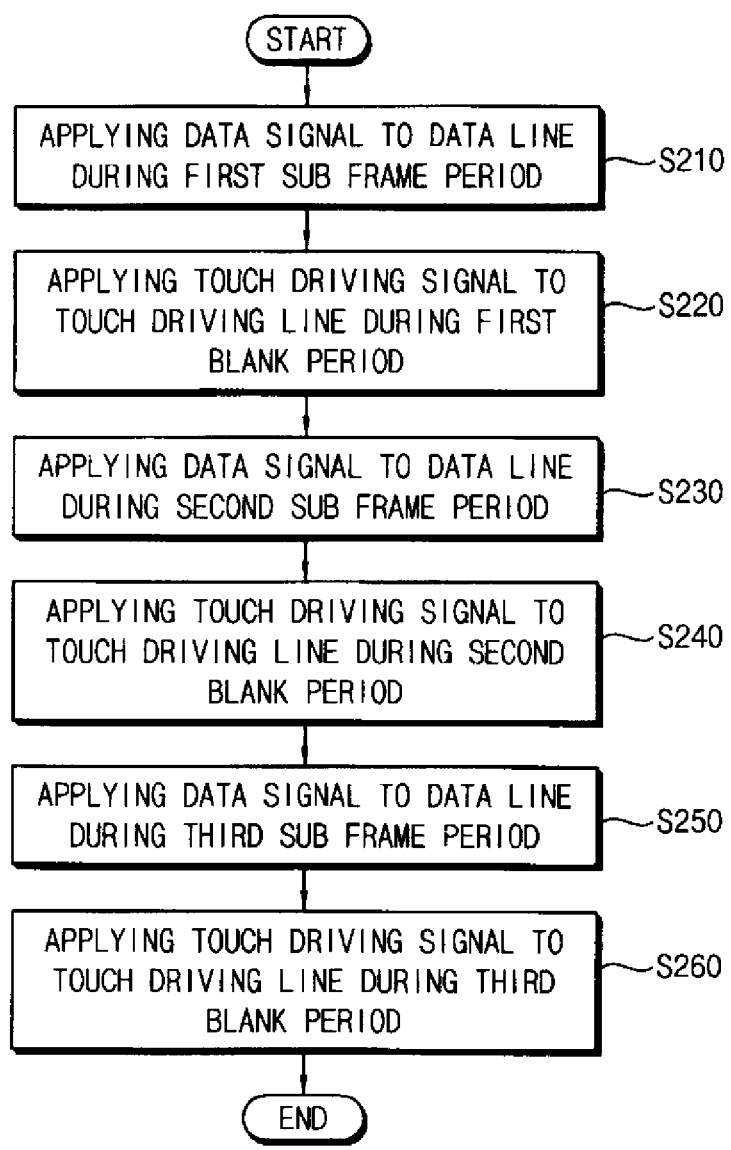
FIG. 16 is a flow chart illustrating an exemplary embodiment of a method of driving a display panel performed by a display panel driving apparatus of FIG. 12.

FIG. 16 is a flow chart illustrating an exemplary embodiment of a method of driving a display panel performed by the display panel driving apparatus 900 of FIG. 12.

Referring to FIGS. 12 to 16, the data signals DS2 is applied to the data lines DL during the first sub frame period SF1 (S210). The gate driving part 920 applies the gate signals GS1, GS2, ..., GSX to the gate lines GL disposed in the first area 801 and the data driving part 910 applies the data signals DS2 to the data lines DL corresponding to the first area 801 during the first sub frame period SF1, in response to the vertical synchronous signal Vsync.

The touch driving signals TDS1, TDS2, ..., TDSN-1 and TDSN are applied to the touch driving lines TDL1, TDL2, ..., TDLN-1 and TDLN during the first blank period BP1 (S220). The first blank period BP1 is next to the first sub frame period SF1, and the gate driving part 920 does not apply the gate signals GS1, GS2, ..., GSX to the gate lines GL during the first blank period BP1. The touch driving part 940 sequentially outputs the touch driving signals TDS1, TDS2, ..., TDSN-1 and TDSN to the touch driving lines TDL1, TDL2, ..., TDLN-1 and TDLN during the first blank period BP1. Thus, the display panel 800 senses the touch thereon.

The data signals DS2 are applied to the data lines DL during the second sub frame period SF2 (S230). The second sub frame period SF2 is next to the first blank period BP1. The gate driving part 920 applies the gate signals GS1, GS2, ..., GSX to the gate lines GL disposed in the second area 802 and the data driving part 810 applies the data signals DS2 to the data lines DL corresponding to the second area 802 during the second sub frame period SF2.

The touch driving signals TDS1, TDS2, ..., TDSN-1 and TDSN are applied to the touch driving lines TDL1, TDL2, ..., TDLN-1 and TDLN during the second blank period BP2 (S240). The second blank period BP2 is next to the second sub frame period SF2, and the gate driving part 920 does not apply the gate signals GS1, GS2, ..., GSX to the gate lines GL during the second blank period BP2. The touch driving part 940 sequentially outputs the touch driving signals TDS1, TDS2, ..., TDSN-1 and TDSN to the touch driving lines TDL1, TDL2, ..., TDLN-1 and TDLN during the second blank period BP2. Thus, the display panel 800 senses the touch thereon.

The data signals DS2 are applied to the data lines DL during the third sub frame period SF3 (S250). The third sub frame period SF3 is next to the second blank period BP2. The gate driving part 920 applies the gate signals GS1, GS2, ..., GSX to the gate lines GL disposed in the third area 803 and the data driving part 810 applies the data signals DS2 to the data lines DL corresponding to the third area 803 during the third sub frame period SF3.

The touch driving signals TDS1, TDS2, ..., TDSN-1 and TDSN are applied to the touch driving lines TDL1, TDL2, ..., TDLN-1 and TDLN during the third blank period BP3 (S260). The third blank period BP3 is next to the third sub frame period SF3, and the gate driving part 920 does not apply the gate signals GS1, GS2, ..., GSX to the gate lines GL during the third blank period BP3. The touch driving part 940 sequentially outputs the touch driving signals TDS1, TDS2, ..., TDSN-1 and TDSN to the touch driving lines TDL1, TDL2, ..., TDLN-1 and TDLN during the third blank period BP3. Thus, the display panel 800 senses the touch thereon.

In an exemplary embodiment, the frame period FRAME includes three sub frame periods SF1, SF2 and SF3 and three blank periods BP1, BP2 and BP3 respectively next to the sub frame periods SF1, SF2 and SF3, but it is not limited thereto. In an exemplary embodiment, the frame period FRAME may include A sub frame periods (A is a natural number greater or equal to 2) and the A blank periods respectively next to the sub frame periods, and the touch driving signals TDS1, TDS2, ..., TDSN-1 and TDSN may be applied to the touch driving lines TDL1, TDL2, ..., TDLN-1 and TDLN during each of the A blank periods. Thus, the touch sense frequency of the display panel 800 may be A times of the driving frequency of the display panel 800.

According to an exemplary embodiment, the frame period FRAME includes the first blank period BP1, the second blank period BP2 and the third blank period BP3, and the touch driving signals TDS1, TDS2, ..., TDSN-1 and TDSN are applied to the touch driving lines TDL1, TDL2, ..., TDLN-1 and TDLN of the display panel 800 during each of the first blank period BP1, the second blank period BP2 and the third blank period BP3. Therefore, the touch sense frequency of the display panel 800 is three times the driving frequency of the display panel 800. In such an embodiment, the touch sense frequency of the display panel 800 is substantially increased.

In an exemplary embodiment, the display panel 800 displays the image during the first sub frame period SF1, the second sub frame period SF2 and the third sub frame period SF3, and senses the touch during the first blank period BP1, the second blank period BP2 and the third blank period BP3 respectively different from the first sub frame period SF1, the second sub frame period SF2 and the third sub frame period SF3. In such an embodiment, a noise of the touch sense is substantially decreased, and thus the SNR of the touch sense is substantially increased.

According to an exemplary embodiment of the method of driving the display panel, the display panel driving apparatus and the display apparatus having the display panel driving apparatus, the display panel may sense A (A is a natural number greater or equal to 2) times during a frame period, and thus a touch sense frequency of the display panel and the display apparatus is substantially increased.

In an exemplary embodiment, the display panel displays an image during a sub frame period and senses a touch during a blank period different from the sub frame period. Thus, a noise of a touch sense is substantially decreased and a SNR of the touch sense is substantially increased.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of driving a display panel, the method comprising:
    applying a first data signal to a data line corresponding to a first area of the display panel during a first sub frame period of a frame period;
    applying a touch driving signal to a touch driving line of the display panel during a first blank period of the frame period, wherein the first blank period is directly after the first sub frame period;
    applying a second data signal different from the first data signal to the data line corresponding to a second area of the display panel during a second sub frame period of the frame period, wherein the second sub frame period is directly after the first blank period; and
    applying the touch driving signal to the touch driving line during a second blank period of the frame period, wherein the second blank period is directly after the second sub frame period,
    wherein the touch driving lines disposed in the first area and the second area corresponding to a while of the display panel are driven during each of the first blank period and the second blank period.

2. The method of claim 1, wherein
    the applying the touch driving signal to the touch driving line during the first blank period comprises sequentially applying the touch driving signal to first to N-th touch driving lines, wherein N is a natural number, and
    the applying the touch driving signal to the touch driving line during the second blank period comprises sequentially applying the touch driving signal to the first to N-th touch driving lines.

3. The method of claim 1, wherein
    the first area and the second area is determined based on a number of gate lines disposed therein,
    a first gate signal is applied to a gate line disposed in the first area during the first sub frame period, and
    a second gate signal is applied to a gate line disposed in the second area during the second sub frame period.

4. The method of claim 1, wherein the touch driving signal comprises a plurality of pulses.

5. The method of claim 1, further comprising:
    applying a third data signal to the data line corresponding to a third area of the display panel during a third sub frame period of the frame period, wherein the third sub frame period is next to the second blank period; and
    applying the touch driving signal to the touch driving line during a third blank period of the frame period, wherein the third blank period is next to the third sub frame period.

6. The method of claim 1, wherein the frame period comprises A sub frame periods and A blank periods respectively next to the A sub frame periods, wherein A is a natural number greater or equal to 2.

7. The method of claim 6, wherein
    the display panel comprises A areas,
    a data signal is applied to a data line corresponding to the A areas during the A sub frame periods, and
    the touch driving signal is applied to the touch driving line during the A blank periods.

8. A display panel driving apparatus comprising:
    a data driving part which applies a first data signal to a data line corresponding to a first area of a display panel during a first sub frame period of a frame period and applies a second data signal different from the first data signal to the data line corresponding to a second area of the display panel during a second sub frame period of the frame period; and
    a touch driving part which applies a touch driving signal to a touch driving line of the display panel during a first blank period directly after the first sub frame and applies the touch driving signal to the touch driving line during a second blank period directly after the second sub frame period and included in the frame period, wherein the second sub frame period is directly after the first blank period,
    wherein the touch driving lines disposed in the first area and the second area corresponding to a whole of the display panel are driven during each of the first blank period and the second blank period wherein the touch driving lines disposed in the first area and the second area corresponding to a whole of the display panel are driven during each of the first blank period and the second blank period.

9. The display panel driving apparatus of claim 8, wherein the touch driving part sequentially applies the touch driving signal to first to N-th touch driving lines during the first blank period, and sequentially applies the touch driving signal to the first to N-th touch driving lines during the second blank period, wherein N is a natural number.

10. The display panel driving apparatus of claim 8, further comprising:
a gate driving part which applies a first gate signal to a gate line disposed in the first area during the first sub frame period and applies a second gate signal to a gate line disposed in the second area during the second sub frame period,
wherein each of the first area and the second area of the display panel is determined based on a number of gate lines in the display panel.

11. The display panel driving apparatus of claim 8, wherein the touch driving signal comprises a plurality of pulses.

12. The display panel driving apparatus of claim 8, wherein
the data driving part applies a third data signal to the data line corresponding to a third area of the display panel during a third sub frame period next to the second blank period and included in the frame period, and
the touch driving part applies the touch driving signal to the touch driving line during a third blank period next to the third sub frame period and included in the frame period.

13. The display panel driving apparatus of claim 8, wherein the frame period comprises A sub frame periods and A blank periods respectively next to the A sub frame periods, wherein A is a natural number greater or equal to 2.

14. The display panel driving apparatus of claim 13, wherein
the display panel comprises A areas,
the data driving part applies a data signal to a data line corresponding to the A areas during the A sub frame periods, and
the touch driving part applies the touch driving signal to the touch driving line during each of the A blank periods.

15. A display apparatus comprising:
a display panel which displays an image; and
a display panel driving apparatus comprising:
a data driving part which applies a first data signal to a data line corresponding to a first area of a display panel during a first sub frame period of a frame and applies a second data signal different from the first data signal to the data line corresponding to a second area of the display panel during a second sub frame period of the frame period; and
a touch driving part which applies a touch driving signal to a touch driving line of the display panel during a first blank period directly after the first sub frame period and applies the touch driving signal to the touch driving line during a second blank period directly after the second sub frame period, wherein the second sub frame period is directly after the first blank period,
wherein the touch driving lines disposed in the first area and the second area corresponding to a whole of the display panel are driven during each of the first blank period and the second blank period.

16. The display apparatus of claim 15, wherein a signal line in the display panel operates as the touch driving line.

17. The display apparatus of claim 16, wherein at least one of a common electrode and a gate line operates as the touch driving line.

18. The display apparatus of claim 15, wherein
the display panel further comprises a touch sense line,
the touch sense line and the touch driving line form a capacitance, and
a signal line in the display panel operates as the touch sense line.

19. The display apparatus of claim 18, wherein at least one of a common electrode and a data line operates as the touch sense line.

20. The display apparatus of claim 15, wherein
the frame period comprises A sub frame periods and A blank periods respectively next to the A sub frame periods, wherein A is a natural number greater or equal to 2,
the display panel comprises A areas,
the data driving part applies a data signal to a data line corresponding to one of the A areas during a corresponding sub frame period of the A sub frame periods, and
the touch driving part applies the touch driving signal to the touch driving line during each of the A blank periods.

* * * * *